United States Patent
Ma et al.

(10) Patent No.: US 7,157,504 B2
(45) Date of Patent: Jan. 2, 2007

(54) INK-JET PRINTING METHODS AND SYSTEMS PROVIDING IMPROVED IMAGE DURABILITY

(75) Inventors: Zeying Ma, San Diego, CA (US); Kent Vincent, Cupertino, CA (US); Sivapackia Ganapathiappan, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 132 days.

(21) Appl. No.: 10/261,441

(22) Filed: Sep. 30, 2002

(65) Prior Publication Data

US 2004/0063808 A1 Apr. 1, 2004

(51) Int. Cl.
*C09D 11/10* (2006.01)
*C08L 39/00* (2006.01)
*C08L 39/08* (2006.01)
*C08L 33/14* (2006.01)

(52) U.S. Cl. .................. 523/160; 524/523; 524/548; 524/555; 524/556

(58) Field of Classification Search .............. 523/160, 523/161; 106/31.6; 524/548, 555, 556, 524/523
See application file for complete search history.

(56) References Cited

U.S. PATENT DOCUMENTS

| | | | |
|---|---|---|---|
| 5,549,740 A | 8/1996 | Takahashi et al. | |
| 5,846,306 A * | 12/1998 | Kubota et al. ........... | 106/31.75 |
| 5,889,083 A * | 3/1999 | Zhu ........................ | 523/161 |
| 5,990,202 A | 11/1999 | Nguyen et al. | |
| 6,034,153 A * | 3/2000 | Tsang et al. .............. | 523/160 |
| 6,204,307 B1 | 3/2001 | Miyabayashi | |
| 6,248,161 B1 | 6/2001 | Nguyen et al. | |
| 6,281,269 B1 * | 8/2001 | Schut ........................ | 523/160 |
| 6,383,278 B1 * | 5/2002 | Hirasa et al. .............. | 106/31.6 |
| 6,439,708 B1 * | 8/2002 | Kato et al. ................. | 347/98 |
| 6,450,632 B1 * | 9/2002 | Tsang et al. ................ | 347/96 |
| 6,460,989 B1 * | 10/2002 | Yano et al. ................. | 347/101 |
| 6,485,138 B1 * | 11/2002 | Kubota et al. .............. | 347/96 |
| 6,713,531 B1 * | 3/2004 | Iijima ........................ | 523/160 |
| 2002/0077386 A1 * | 6/2002 | Kurabayashi et al. ....... | 523/161 |
| 2003/0069329 A1 * | 4/2003 | Kubota et al. .............. | 523/160 |
| 2003/0219539 A1 * | 11/2003 | Nigam .................... | 427/372.2 |
| 2004/0024083 A1 * | 2/2004 | Lee ........................... | 523/160 |
| 2004/0046848 A1 * | 3/2004 | Payne et al. ................ | 347/101 |
| 2004/0071900 A1 * | 4/2004 | Ray et al. .................. | 428/32.1 |

FOREIGN PATENT DOCUMENTS

| | | |
|---|---|---|
| EP | 0697445 A2 | 2/1996 |
| EP | 1041126 A2 | 4/2000 |
| EP | 1122287 A1 | 8/2001 |
| WO | WO 02/36696 | 5/2002 |

OTHER PUBLICATIONS

Odian, George; Principles of Polymerization 3rd Edition, John Wiley & Sons, New York, 1991 (p. 341).*

* cited by examiner

*Primary Examiner*—Callie Shosho

(57) ABSTRACT

Systems and methods for providing smudge resistant and durable ink-jet images having good optical density are provided. Specifically, a system for printing durable ink-jet ink images can comprise a set of two ink-jet pens, preferably thermal ink-jet pens. The first ink-jet pen contains an ink-jet ink, wherein the ink-jet ink comprises a first liquid vehicle, from 0.5% to 6% by weight of a pigment colorant, and from 0.2% to 15% by weight of an anionic or neutral latex-containing colloidal suspension. The second ink-jet pen contains a fixer composition, wherein the fixer composition comprises effective amounts of second liquid vehicle, and from 0.2% to 15% by weight of a cationic polymer such as poly(vinyl pyridine) salts, polyalkylaminoethyl acrylates, polyalkylaminoethyl methacrylates, poly(vinyl imidazole); or preferably, polyethyleneimines, polybiguanides, and/or polyguanides. When applied to the substrate, upon overprinting or underprinting the fixer composition with respect to the ink-jet ink, a durable and smudge resistant image is formed. A method of the present invention can utilize the system and provide for underprinting or overprinting the fixer composition as desired.

56 Claims, No Drawings

INK-JET PRINTING METHODS AND SYSTEMS PROVIDING IMPROVED IMAGE DURABILITY

FIELD OF THE INVENTION

The present invention is drawn to the area of ink-jet imaging. More specifically, the present invention is drawn to pigment-based ink-jet ink methods and systems for use with ink-jet ink pens that exhibit improved image durability.

BACKGROUND OF THE INVENTION

Computer printer technology has evolved to a point where very high resolution images can be transferred to various types of media, including paper. One particular type of printing involves the placement of small drops of a fluid ink onto a media surface in response to a digital signal. Typically, the fluid ink is placed or jetted onto the surface without physical contact between the printing device and the surface. Within this general technique, the specific method that the ink-jet ink is deposited onto the printing surface varies from system to system, and can include continuous ink deposit and drop-on-demand.

With regard to continuous printing systems, inks used are typically based on solvents such as methyl ethyl ketone and ethanol. Essentially, continuous printing systems function as a stream of ink droplets are ejected and directed by a printer nozzle. The ink droplets are directed additionally with the assistance of an electrostatic charging device in close proximity to the nozzle. If the ink is not used on the desired printing surface, the ink is recycled for later use. With regard to drop-on-demand printing systems, the ink-jet inks are typically based upon water and solvents such as glycols. Essentially, with these systems, ink droplets are propelled from a nozzle by heat or by a pressure wave such that all of the ink droplets ejected are used to form the printed image.

There are several reasons that ink-jet printing has become a popular way of recording images on various media surfaces, particularly paper. Some of these reasons include low printer noise, capability of high-speed recording, and multi-color recording. Additionally, these advantages can be obtained at a relatively low price to consumers. However, though there has been great improvement in ink-jet printing, accompanying this improvement are increased demands by consumers in this area, e.g., higher speeds, higher resolution, full color image formation, increased stability, etc.

In general, ink-jet inks are either dye- or pigment-based inks. Both are typically prepared in an liquid vehicle that contains the dye and/or the pigment. Dye-based ink-jet inks generally use a liquid colorant that is usually water-based to turn the media a specific color. Conversely, pigmented inks typically use a solid or dispersed colorant to achieve color.

Many properties that are desirable for ink-jet printing include good edge acuity and optical density of an image on a media substrate, good dry time of the ink on the substrate, adhesion to the substrate, lack of deviation of ink droplets when fired, presence of all dots, resistance of the ink after drying to water and other solvents, long-term storage stability, good dot size and dot gain, color-to-color bleed alleviation, acceptable coalescence, long term reliability without corrosion or nozzle clogging, good light fastness, good wet fastness, low humid hue shift, and other known properties. Many inks are known to possess some of the above described properties. However, few inks are known that possess all of these properties, since an improvement in one property often results in the degradation in another property. Accordingly, investigations continue into developing ink formulations that have improved properties and that do not improve one property at the significant detriment of another. However, many challenges still remain to further improve the image quality and lightfastness of ink-jet prints without sacrificing pen performance and reliability.

SUMMARY OF THE INVENTION

It has been recognized that the use of certain components in ink-jet ink systems can provide good image permanence and smudge resistance. It has also been recognized that certain components for use in such systems can be formulated for use with good reliability using an ink-jet pen. Specifically, a system for printing durable ink-jet ink images can comprise two ink-jet pens. The first ink-jet pen contains an ink-jet ink, wherein the ink-jet ink comprises a first liquid vehicle, from 0.5% to 6% by weight of a pigment colorant, and from 0.2% to 15% by weight of an anionic or neutral latex-containing colloidal suspension. The second ink-jet pen contains a fixer composition, wherein the fixer composition comprises effective amounts of a second liquid vehicle, and from 0.2% to 15% by weight of a cationic polymer such as poly(vinyl pyridine) salts, polyalkylaminoethyl acrylates, polyalkylaminoethyl methacrylates, poly(vinyl imidazole); or preferably, polyethyleneimines, polybiguanides, and/or polyguanides. When applied to a substrate, upon overprinting or underprinting the fixer composition with respect to the ink-jet ink, a durable and smudge resistant image is formed.

It has also been recognized that a method of providing smudge resistant images using the above system, or a like system, would be advantageous in the art. Specifically, a method of printing a durable ink-jet ink image can comprise the steps of (a) providing an ink-jet ink comprising effective amounts of a first liquid vehicle, from 0.5% to 6% by weight of a pigment colorant, and from 0.2% to 15% by weight of an anionic or neutral latex-containing colloidal suspension; (b) providing a fixer composition comprising effective amounts of a second liquid vehicle, and from 0.2% to 15% by weight of a cationic polymer such as poly(vinyl pyridine) salts, polyalkylaminoethyl acrylates, polyalkylaminoethyl methacrylates, poly(vinyl imidazole); or preferably, polyethyleneimines, polybiguanides, and/or polyguanides; and (c) jetting the ink-jet ink onto the substrate, and (d) jetting the fixer composition onto the substrate, such that the ink-jet ink contacts the fixer composition, thereby providing a durable and smudge-resistant ink-jet ink image on the substrate. Preferably, the jetting steps are carried out using thermal ink-jet pens.

DETAILED DESCRIPTION OF THE PREFERRED EMBODIMENT(S)

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

It must be noted that, as used in this specification and the appended claims, the singular forms "a," "an," and "the" include plural referents unless the context clearly dictates otherwise.

As used herein, "effective amount" refers to the minimal amount of a substance or agent, which is sufficient to achieve a desired effect. For example, an effective amount of a "liquid vehicle" is the minimum amount required for use in an ink composition or a fixer composition of the present invention, while maintaining properties in accordance with embodiments of the present invention.

As used herein, "liquid vehicle" refers to the fluid in which pigments and latex colloids are dispersed to form ink-jet inks for thermal ink-jet ink applications, or refers to the fluid in which cationic polymers are dispersed to form fixer compositions for thermal ink-jet ink applications. Many liquid vehicles and vehicle components are known in the art. Typical ink vehicles can include a mixture of a variety of different agents, such as surfactants, solvents, co-solvents, buffers, biocides, sequestering agents, viscosity modifiers, surface-active agents, and water.

"Latex-containing colloidal suspensions" refers to liquid suspensions comprising a liquid (such as water) and polymeric particulates from 20 nm to 500 nm (preferably from 100 nm to 300 nm) in size, and have a weight average molecular weight from about 10,000 Mw to 2,000,000 Mw (preferably from about 40,000 Mw to 100,000 Mw). Typically, the polymeric particulate will be present in the liquid at from 0.5% to 15% by weight. Such polymeric particulates can comprise a plurality of monomers that are randomly polymerized, and are preferably crosslinked. When crosslinked, the molecular weight can be even higher than that cited above. Additionally, the latex component can preferably have a glass transition temperature from about $-25°$ C. to $100°$ C.

"Latex primer" refers to compositions having from finely dispersed to dissolved polymeric particulates having a maximum size of about 200 nm. Though not required, latex primer can be used with the systems and methods of the present invention to help in stabilization and jettability of the ink-jet ink compositions of the present invention.

"Cationic components," when referring to the dispersants within the fixer composition, refers to polymers, multivalent ions, and the like, that are positively charged and act to fix a latex component of a latex-containing colloidal suspension within as ink-jet ink upon contact.

"Self-dispersed pigment" refers to pigments that have been chemically surface modified with a charge or a polymeric grouping, wherein the chemical modification aids the pigment in becoming and/or substantially remaining dispersed in a liquid vehicle.

"Polymer-dispersed pigment" refers to pigments that utilize a dispersant (which can be a polymer, an oligomer, or a surfactant, for example) in a liquid vehicle and/or pigments that utilize a physical coating to aid the pigment in becoming and/or substantially remaining dispersed in a liquid vehicle.

With this in mind, the present invention is drawn to the area of ink-jet imaging. More specifically, the present invention is drawn to systems and methods of printing wherein a smudge resistant and permanent image can be obtained. In one embodiment, a system for printing durable ink-jet ink images can comprise two ink-jet pens. The first ink-jet pen can contain an ink-jet ink, wherein the ink-jet ink comprises a first liquid vehicle, from 0.5% to 6% by weight of a pigment colorant, and from 0.2% to 15% by weight of a latex-containing colloidal suspension. The second ink-jet pen can contain a fixer composition, wherein the fixer composition comprises effective amounts of a second liquid vehicle and from 0.2% to 15% by weight of a cationic polymer such as poly(vinyl pyridine) salts, polyalkylaminoethyl acrylates, polyalkylaminoethyl methacrylates, poly (vinyl imidazole); or preferably, polyethyleneimines, polybiguanides, and/or polyguanides. Thus, upon overprinting or underprinting the fixer composition with respect to the ink-jet ink on a substrate, a durable and smudge resistant image is formed.

In another embodiment, a method of printing a durable ink-jet ink image can comprise the steps of (a) providing an ink-jet ink comprising effective amounts of a first liquid vehicle, from 0.5% to 6% by weight of a pigment colorant, and from 0.2% to 15% by weight of a latex-containing colloidal suspension; (b) providing a fixer composition comprising effective amounts of a second liquid vehicle, and from 0.2% to 15% by weight of a cationic polymer such as poly(vinyl pyridine) salts, polyalkylaminoethyl acrylates, polyalkylaminoethyl methacrylates, poly(vinyl imidazole); or preferably, polyethyleneimines, polybiguanides, and/or polyguanides; (c) jetting the ink-jet ink onto a substrate; and (d) jetting the fixer composition onto the substrate, such that the ink-jet ink contacts the fixer composition, thereby providing a durable and smudge-resistant ink-jet ink image.

With respect to either the methods or the systems set forth herein, the latex-containing colloidal suspension can comprise polymeric particulates having a particle size range from about 20 nm to 500 nm, and preferably from about 100 nm to 300 nm. There are a number of compositions that can make up the polymeric particulates of the latex-containing colloidal suspensions, including randomly polymerized monomers, wherein the polymeric particulates as a whole are from about 10,000 Mw to 2,000,000 Mw, and preferably from about 40,000 Mw to 100,000 Mw. Additionally, latex having a glass transition temperature from $-25°$ C. to $100°$ C. is preferred.

To illustrate an example, the plurality of randomly polymerized monomers can include various combinations of methyl methacrylate, hexyl acrylate, methacryloyloxy ethyl succinate, and ethylene glycol dimethacrylate. One embodiment includes all of these compositions randomly polymerized into common polymeric particulates. For example, these four components can be present, each by weight, at from 10% to 90% methyl methacrylate, from 10% to 90% hexyl acrylate, from 0% to 25% methacryloyloxy ethyl succinate, and from 0% to 5% ethylene glycol dimethacrylate.

With respect to both the first and the second liquid vehicle, any of a number of components can be present that are effective for use with thermal ink-jet ink technologies. For example, the liquid vehicle of the ink or the fixer can comprise an effective amount of water, from 0.05% to 5% by weight of a surfactant, from 5% to 50% by weight of a solvent, from 0.05% to 2% by weight of a biocide. Other components can also be present as described with respect to liquid vehicle components herein. Multiple liquid vehicle components of a single class can also be present, such as multiple solvents, multiple surfactants, etc. With respect to the latex-containing colloidal suspension containing ink-jet ink, optionally, from 0.1% to 5% of a latex primer can also be present in the liquid vehicle.

Optionally, the fixer composition can contain ions or other compositions that can further assist the fixing of the ink-jet ink composition. For example, in addition to the cationic polymer composition that can be present in the fixer, a multivalent salt can also be present. Examples include multivalent metal nitrates, EDTA salts, phosphonium halide salts, organic acids (such as glycolic acid, succinic acid, citric acid, acetic acid, and the like), and combinations thereof.

Various types of pigments can also be used, such as self-dispersed pigments and/or polymer dispersed pigments. If a polymer-dispersed pigment is used, then the liquid vehicle can further comprise a dispersing agent, or the pigment can be physically coated with a dispersing agent.

The method, using the system, can be carried out by overprinting the fixer composition atop the latex-containing ink-jet ink. Alternatively, the method, using the system, can be carried out by underprinting the fixer composition beneath the latex-containing ink-jet ink. A combination of these embodiments can also be utilized for desired results.

Adding latex to pigmented inks alone can improve, to some degree, the smudge and smear resistance, but not to the extent of being desirable. In addition, due to the enhanced penetration effectuated by the presence of the latex, color strength of a printed image can become decreased, as evidenced by a reduction in optical density (OD). Fixer, on the other hand, can stop undesired penetration of ink-jet inks, but alone is not known to provide substantial durability when used with conventional thermal ink-jet ink systems. By combining the use of a pigment/latex-containing ink-jet ink with the use of a fixer composition that is configured for interacting with the pigment and/or the latex component of the ink-jet ink, smudge and smear resistance can be greatly decreased while maintaining good color strength. This enhanced smear and smudge resistance, as well as the maintaining of good color strength, is noticeable upon partial drying when images are produced using the systems and methods of the present invention.

Thermal ink-jet systems are quite different in their jetting properties than piezo ink-jet systems. As such, polymers that are effective for use in piezo ink-jet systems are not necessarily effective for use with thermal ink-jet ink systems. However, the converse is not necessarily true. In other words, polymers that work well with thermal ink-jet systems are more likely to work with piezo systems than vice versa. Therefore, the selection of polymers for use with thermal ink-jet systems often requires more care, as thermal ink-jet systems are less forgiving than piezo ink-jet systems. As such, the polymers and other components used in both the ink-jet inks and the fixer compositions of the present invention are particularly adapted for use with thermal ink-jet ink systems, though they are functional with piezo ink-jet ink systems as well.

EXAMPLES

The following examples illustrate the embodiments of the invention that are presently best known. However, it is to be understood that the following are only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following Examples provide further detail in connection with what are presently deemed to be the most practical and preferred embodiments of the invention.

Example 1

Preparation of Pigment-containing Ink-jet Inks with and without the Presence of a Latex-containing Colloidal Suspension Several different ink-jet inks comprising a latex-containing colloidal suspension and a pigment as well as ink-jet inks void of any latex-containing colloidal suspension component as a control were prepared according to Tables 1 to 3 as follows:

TABLE 1

Polymer-dispersed magenta pigment-containing ink-jet ink compositions with and without latex-containing colloidal suspension

| Ink ID | Magenta A (wt %) | Magenta B - Control (wt %) |
|---|---|---|
| Ethylene oxide adduct of glycerine | 3 | 3 |
| 2-pyrrolidone | 6 | 6 |
| Glycerol | 5 | 5 |
| Alkyl Diol | 4 | 4 |
| Tertiary Acetylenic Alcohol | 0.75 | 0.75 |
| Primary Alkyl Alcohol | 0.75 | 0.75 |
| Fluorosurfactant | 0.2 | 0.2 |
| Solution of 1,2-benzisothiazolin-3-one, NaOH, and dipropylene glycol | 0.2 | 0.2 |
| Magenta polymer-dispersed pigment | ~3 to 3.5 | ~3 to 3.5 |
| Latex-Containing Colloidal Suspension | ~3 to 4 | 0 |
| Latex Primer | 1 | 0 |
| Deionized water | Balance | Balance |
| Total | 100 | 100 |

TABLE 2

Self-dispersed magenta pigment-containing ink-jet ink compositions with and without latex-containing colloidal suspension

| Ink ID | Magenta C (wt %) | Magenta D - Control (wt %) |
|---|---|---|
| Ethylene oxide adduct of glycerine | 3 | 3 |
| 2-pyrrolidone | 6 | 6 |
| Glycerol | 5 | 5 |
| Alkyl Diol | 4 | 4 |
| Tertiary Acetylenic Alcohol | 0.75 | 0.75 |
| Primary Alkyl Alcohol | 0.75 | 0.75 |
| Fluorosurfactant | 0.2 | 0.2 |
| Solution of 1,2-benzisothiazolin-3-one, NaOH, and dipropylene glycol | 0.2 | 0.2 |
| Magenta self-dispersed pigment | ~3 to 3.5 | ~3 to 3.5 |
| Latex-Containing Colloidal Suspension | ~3 to 4 | 0 |
| Latex Primer | 1 | 0 |
| Deionized water | Balance | Balance |
| Total | 100 | 100 |

TABLE 3

Polymer-dispersed cyan pigment-containing ink-jet inks with and without latex-containing colloidal suspension

| Ink ID | Cyan A (wt %) | Cyan B - Control (wt %) |
|---|---|---|
| Ethylene oxide adduct of glycerine | 3 | 3 |
| 2-pyrrolidone | 6 | 6 |
| Glycerol | 5 | 5 |

TABLE 3-continued

Polymer-dispersed cyan pigment-containing ink-jet inks with and without latex-containing colloidal suspension

| Ink ID | Cyan A (wt %) | Cyan B - Control (wt %) |
|---|---|---|
| Alkyl Diol | 4 | 4 |
| Tertiary Acetylenic Alcohol | 0.75 | 0.75 |
| Primary Alkyl Alcohol | 0.75 | 0.75 |
| Fluorosurfactant | 0.2 | 0.2 |
| Solution of 1,2-benzisothiazolin-3-one, NaOH, and dipropylene glycol | 0.2 | 0.2 |
| Cyan Polymer-Dispersed | 2 | 0 |
| Latex-Containing Colloidal Suspension | ~3 to 4 | 0 |
| Latex Primer | 1 | 0 |
| Deionized water | Balance | Balance |
| Total | 100 | 100 |

In Tables 1 to 3 above, Latex-Containing Colloidal Suspension comprises randomly polymerized particulates suspended in water, wherein the particulates are from about 100 nm to 300 nm in size, and are from about 40,000 Mw to 100,000 Mw. Latex-Containing Colloidal Suspension comprises 41% to 44.5% methyl methacrylate, 44.5% to 48% hexyl acrylate, 10% methacryloyloxy ethyl succinate, and 1% ethylene glycol dimethacrylate, each by weight.

The specific latex used was prepared as according to the following. Methyl methacrylate (102.5 g), hexyl acrylate (120 g), mono-methacryloyloxyethyl succinate (25 g), ethylene glycol dimethacrylate (2.5 g) and isooctylthioglycolate (1.0 g) were mixed together to form a monomer mixture. Water (85 g) and 30% Rhodafac (20.8 g) were then added to the monomer mixture and sheared gently to form an emulsion. At the same time, water (725 g) was heated to 90° C. in a reactor. An initiator solution was prepared by dissolving potassium persulfate (0.87 g) in water (100 g) and added dropwise to the hot water at a rate of 3 ml/minute while stirring the water. After 3 minutes, the emulsion addition was then started dropwise to the water while continuing the addition of initiator solution. The emulsion addition took 30 min. The reaction mixture was maintained at 90° C. for 2 hours and allowed to cool. When the temperature of the reactor was about 50° C., 23 g of 17.5% potassium hydroxide solution was added to bring the pH of the reaction mixture to 8.5. The reaction mixture was filtered with a 200 mesh filter to obtain stable polymer particles with an average size of 230 nm. Though the above latex composition was prepared as cited above, this is only exemplary, as other acrylic and methacrylic or unsaturated monomers that can be polymerized by free-radicals can be used to obtain similar properties in accordance with the present invention.

Latex Primer refers to finely dispersed (and in some cases dissolved) particulates having a maximum size of about 200 nm. Though not required, the Latex Primer can be used to stabilize a formulation containing both a Latex-Containing Colloidal Suspension and a pigment in a common liquid vehicle. The Latex Primer can also increase the reliability of a thermal ink-jet ink pen containing such a composition. The ink-jet inks referred to as Magenta B, Magenta D, and Cyan B (Control Inks) in Tables 1 to 3, respectively, do not include a Latex-Containing Colloidal Suspension. Magenta A (with latex) will be compared to Magenta B (without latex), Magenta C (with latex) will be compared to Magenta D (without latex), and Cyan A (with latex) will be compared to Cyan B (without latex).

Example 2

Preparation of PEI/$Ca^{2+}$ Fixer Compositions

A polyethyleneimine/calcium ion-containing fixer composition was prepared according to Table 4 as follows:

TABLE 4

PEI/$Ca^{2+}$ fixer composition

| INGREDIENT | Wt % |
|---|---|
| ethoxylated trimethylnonanol | 0.45 |
| olefine sulfonate | 0.2 |
| 2-pyrrolidone | 5 |
| Alkyl Diol | 10 |
| TINNULOX ™ BBS | 100 ppm |
| Polyethyleneimine | 5 |
| Calcium Nitrate.4$H_2O$ | 2.5 |
| Deionized water | Balance |
| Total | 100 |

*PH adjusted to 4.0 with NaOH or $HNO_3$

Example 3

Preparation of Polybiguanide Fixer Composition

A polybiguanide-containing fixer composition was prepared according to Table 5 as follows:

TABLE 5

Polybiguanide fixer composition

| INGREDIENT | Wt % |
|---|---|
| propylene glycol n-propyl ether | 1 |
| Alkyl Diol | 5 |
| fluorosurfactant | 0.3 |
| polyoxyethylene ether | 0.4 |
| 2-pyrrolidone | 10 |
| $Na_2$EDTA | 0.1 |
| Polybiguanide | 4 |
| Deionized water | Balance |
| Total | 100 |

*PH adjusted to 4.0 with NaOH or $HNO_3$

Example 4

Wet Smudge Performance

Tables 6 to 13 below depict the results illustrating the advantage of using a latex-containing ink-jet ink in conjunction with fixer composition. Examples are provided with and without fixer, with and without latex, using overprinting and/or underprinting, using cyan and magenta pigments, and using self-dispersed and polymer dispersed pigments. In each of the tests conducted, all drop weight were about 8 picoliters. Various numbers of drops of fixer composition were tested for both underprinting and overprinting embodiments. Ideally, a printed image will have a high optical density (OD) indicating a rich color image both before and after conducting the smudge test of the present example.

Specifically, smudge performance was quantified as several printed bars were "wet smudged" by deliberately attempting to cause a smudge trail at two predetermined times after printing, i.e., 10 minutes and 24 hours. The wet smudge test was conducted by holding the printed bar pattern image at a 45 angle, dropping 2 cc of water onto the image, and smudging the dampened area with a finger. The milli-optical density (mOD) was measured at the smudge trail between adjacent bars separated by about 5 mm. Greater smudge resistance resulted in a desired low mOD reading. Thus, the lower the mOD reading, the more permanent and smudge resistant the image. Tables 6 to 13 below provide the results of the testing for both the smudge trail, as well as for the printed bar patterns before and after wet smudge testing. The fixer composition used with respect to Tables 6 to 11 was that prepared in accordance with Table 4, i.e., PEI/$Ca^{2+}$ fixer composition. The fixer composition used with respect to Tables 12 and 13 was that prepared in accordance with Table 5, i.e., polybiguanine fixer composition. The paper used for all examples was LUSTRO LASER™, though office paper and other coated papers are effective for use as well.

TABLE 9

Wet smudge testing results for Magenta D (self-dispersed pigment with no latex present) with and without PEI/$CA^{2+}$ fixer

| Test No. | Fixer Underprint (drops) | Magenta Control (drops) | Fixer Overprint (drops) | Initial Image Bar (OD) | Smudge Trail 10 min (mOD) | Smudge Trail 24 hrs (mOD) |
|---|---|---|---|---|---|---|
| 1 | 0 | 3 | 0 | 1.64 | 450 | 470 |
| 2 | 0 | 3 | 1 | 1.71 | 470 | 350 |
| 3 | 0 | 3 | 3 | 1.55 | 500 | 300 |

TABLE 6

Wet smudge testing results for Magenta A (polymer-dispersed pigment with 3% latex present) with and without PEI/$Ca^{2+}$ fixer

| Test No. | Fixer Underprint (drops) | Magenta Control (drops) | Fixer Overprint (drops) | Initial Image Bar (OD) | Smudged Image Bar (OD) | Smudge Trail 10 min (mOD) | Smudge Trail 24 hrs (mOD) |
|---|---|---|---|---|---|---|---|
| 1 | 0 | 4 | 0 | 1.63 | 1.36 | 180 | 90 |
| 2 | 1 | 4 | 0 | 1.65 | 1.33 | 10 | 10 |
| 3 | 3 | 4 | 0 | 1.42 | 1.45 | 0 | 10 |
| 4 | 0 | 4 | 1 | 1.51 | 1.67 | 50 | 10 |
| 5 | 0 | 4 | 3 | 1.32 | 1.37 | 10 | 10 |
| 6 | 1 | 4 | 2 | 1.45 | 1.65 | 20 | 10 |

TABLE 7

Wet smudge testing results for Magenta B (polymer-dispersed pigment with no latex present) with and without PEI/$Ca^{2+}$ fixer

| Test No. | Fixer Underprint (drops) | Magenta Control (drops) | Fixer Overprint (drops) | Initial Image Bar (OD) | Smudged Image Bar (OD) | Smudge Trail 10 min (mOD) | Smudge Trail 24 hrs (mOD) |
|---|---|---|---|---|---|---|---|
| 1 | 0 | 4 | 0 | 2.11 | 0.49 | 240 | 60 |
| 2 | 1 | 4 | 0 | 1.94 | 1.66 | 120 | 30 |
| 3 | 3 | 4 | 0 | 1.87 | 1.69 | 70 | 10 |
| 4 | 0 | 4 | 1 | 1.94 | 1.55 | 120 | 60 |
| 5 | 0 | 4 | 3 | 1.51 | 1.39 | 240 | 10 |
| 6 | 1 | 4 | 2 | 1.67 | 1.67 | 80 | 10 |

TABLE 8

Wet smudge testing results for Magenta C (self-dispersed pigment with 4% latex present) with and without PEI/$Ca^{2+}$ fixer

| Test No. | Fixer Underprint (drops) | Magenta Control (drops) | Fixer Overprint (drops) | Initial Image Bar (OD) | Smudged Image Bar (OD) | Smudge Trail 10 min (mOD) | Smudge Trail 24 hrs (mOD) |
|---|---|---|---|---|---|---|---|
| 1 | 0 | 4 | 0 | 1.55 | 1.45 | 60 | 0 |
| 2 | 1 | 4 | 0 | 1.71 | N/A | 0 | 0 |
| 3 | 3 | 4 | 0 | 1.38 | N/A | 0 | 0 |
| 4 | 0 | 4 | 1 | 1.64 | N/A | 0 | 0 |
| 5 | 0 | 4 | 3 | 1.60 | N/A | 0 | 0 |
| 6 | 1 | 4 | 2 | 1.60 | N/A | 0 | 0 |

TABLE 10

Wet smudge testing results for Cyan A (polymer-dispersed pigment with 3% latex present) with and without PEI/Ca$^{2+}$ fixer

| Test No. | Fixer Underprint (drops) | Magenta Control (drops) | Fixer Overprint (drops) | Initial Image Bar (OD) | Smudged Image Bar (OD) | Smudge Trail 10 min (mOD) | Smudge Trail 24 hrs (mOD) |
|---|---|---|---|---|---|---|---|
| 1 | 0 | 4 | 0 | 2.07 | 1.27 | 220 | 100 |
| 2 | 1 | 4 | 0 | 2.01 | 1.84 | 100 | 50 |
| 3 | 3 | 4 | 0 | 1.83 | 1.58 | 10 | 10 |
| 4 | 0 | 4 | 1 | 2.07 | 1.72 | 60 | 0 |
| 5 | 0 | 4 | 3 | 2.06 | 1.73 | 20 | 0 |
| 6 | 1 | 4 | 2 | 1.95 | 1.79 | 0 | 0 |

TABLE 11

Wet smudge testing results for Cyan B (polymer-dispersed pigment with no latex present) with and without PEI/Ca$^{2+}$ fixer

| Test No. | Fixer Underprint (drops) | Magenta Control (drops) | Fixer Overprint (drops) | Initial Image Bar (OD) | Smudged Image Bar (OD) | Smudge Trail 10 min (mOD) | Smudge Trail 24 hrs (mOD) |
|---|---|---|---|---|---|---|---|
| 1 | 0 | 4 | 0 | 1.34 | 0.86 | 350 | 190 |
| 2 | 1 | 4 | 0 | 1.85 | 0.86 | 350 | 150 |
| 3 | 3 | 4 | 0 | 1.56 | 1.18 | 190 | 10 |
| 4 | 0 | 4 | 1 | 1.79 | 1.27 | 190 | 10 |
| 5 | 0 | 4 | 3 | 1.60 | 1.36 | 190 | 0 |
| 6 | 1 | 4 | 2 | 1.47 | 1.07 | 80 | 0 |

TABLE 12

Wet smudge testing results for Cyan A (polymer-dispersed pigment with 3% latex present) with and without polybiguanide fixer

| Test No. | Fixer Underprint (drops) | Magenta Control (drops) | Fixer Overprint (drops) | Initial Image Bar (OD) | Smudged Image Bar (OD) | Smudge Trail 10 min (mOD) | Smudge Trail 24 hrs (mOD) |
|---|---|---|---|---|---|---|---|
| 1 | 0 | 4 | 0 | 2.13 | 0.88 | 280 | 100 |
| 2 | 1 | 4 | 0 | 1.99 | 1.92 | 110 | 10 |
| 3 | 3 | 4 | 0 | 1.28 | 1.39 | 30 | 10 |
| 4 | 0 | 4 | 1 | 1.69 | 1.60 | 80 | 0 |
| 5 | 0 | 4 | 3 | 1.43 | 1.50 | 20 | 0 |
| 6 | 1 | 4 | 2 | 1.41 | 1.39 | 0 | 0 |

TABLE 13

Wet smudge testing results for Cyan B (polymer-dispersed pigment with no latex present) with and without polybiguanide fixer

| Test No. | Fixer Underprint (drops) | Magenta Control (drops) | Fixer Overprint (drops) | Initial Image Bar (OD) | Smudged Image Bar (OD) | Smudge Trail 10 min (mOD) | Smudge Trail 24 hrs (mOD) |
|---|---|---|---|---|---|---|---|
| 1 | 0 | 4 | 0 | 1.31 | 0.83 | 310 | 170 |
| 2 | 1 | 4 | 0 | 1.50 | 0.88 | 230 | 210 |
| 3 | 3 | 4 | 0 | 1.52 | 1.14 | 150 | 40 |
| 4 | 0 | 4 | 1 | 1.52 | 0.92 | 210 | 260 |
| 5 | 0 | 4 | 3 | 1.38 | 1.35 | 130 | 40 |
| 6 | 1 | 4 | 2 | 1.38 | 1.25 | 350 | 50 |

As can be seen by comparing Tables 6 and 7, Tables 8 and 9, Tables 10 and 11, and Tables 12 and 13, by providing a system that includes 1) ink-jet ink having a pigment (either polymer-dispersed or self-dispersed) and a latex colloidal suspension, and 2) a fixer composition having a cationic polymer present, a great increase in smudge resistance can often be realized at both 10 minutes and 24 hours after printing. For example, with polymer-dispersed pigment, in the absence of latex (Table 7), even with the help of fixer, the best performance was 70 mOD for the 10 minute wet smudge test. With the use of latex (Tables 6), the transfer was reduced to from ~10 to 20 mOD in some tests, which can be considered "non-visible." Additionally, the use of just latex without fixer provided the unacceptable results of about 240 mOD after 10 minutes. With respect to self-dispersed pigment, transfer was extremely sever where no latex was used (Table 9), and fixer added virtually no significant improvement. However, with latex and fixer present, the images became completely resistant to the wet smudge in most of the tests conducted (Table 8). Because smudge resistance can be substantially reduced, the optical density of the image can remain at an acceptable level, thereby providing image permanence.

While the invention has been described with reference to certain preferred embodiments, those skilled in the art will appreciate that various modifications, changes, omissions, and substitutions can be made without departing from the spirit of the invention. It is intended, therefore, that the invention be limited only by the scope of the following claims.

What is claimed is:

1. A system for printing durable ink-jet ink images, comprising:
    a) a first ink-jet pen containing an ink-jet ink, said ink-jet ink comprising
        i) a first liquid vehicle,
        ii) from 0.5% to 6% by weight of a pigment colorant,
        iii) from 0.2% to 15% by weight of an anionic or neutral latex-containing colloidal suspension, wherein the latex-containing colloidal suspension comprises polymeric particulates having a particle size range from about 20 nm to 500 nm, and
        iv) from 0.1% to 5% by weight of latex primer; and
    b) a second ink-jet pen containing a fixer composition, said fixer composition comprising
        i) a second liquid vehicle, and
        ii) from 0.2% to 15% by weight of a cationic polymer selected from the group consisting of poly(vinyl pyridine) salts, polyalkylaminoethyl acrylates, polyalkylaminoethyl methacrylates, poly(vinyl imidazole), polyethyleneimines, polybiguanides, and polyguanides,
wherein, upon overprinting or underprinting the fixer composition with respect to the ink-jet ink on a substrate, a durable and smudge resistant image is formed.

2. A system as in claim 1 wherein the first ink-jet pen and the second ink-jet pen are thermal ink-jet pens.

3. A system as in claim 1 wherein the cationic polymer is a polyethyleneimine.

4. A system as in claim 1 wherein the cationic polymer is a polybiguanide.

5. A system as in claim 1 wherein the cationic polymer is a polyguanide.

6. A system as in claim 1 wherein the polymeric particulates have a particle size range from about 100 nm to 300 nm.

7. A system as in claim 1 wherein the polymeric particulates comprise a plurality of randomly polymerized monomers, and wherein the polymeric particulates as a whole have a weight average molecular weight from about 10,000 Mw to 2,000,000 Mw.

8. A system as in claim 7 wherein the polymeric particulates as a whole have a weight average molecular weight from about 40,000 Mw to 100,000 Mw.

9. A system as in claim 7 wherein the plurality of randomly polymerized monomers include methyl methacrylate and hexyl acrylate.

10. A system as in claim 1 wherein the first liquid vehicle comprises water, from 0.05% to 5% by weight of a surfactant, from 5% to 50% by weight of a solvent, and from 0.05% to 2% by weight of a biocide.

11. A system as in claim 1 wherein the second liquid vehicle comprises water, from 0.05% to 5% by weight of a surfactant, from 5% to 50% by weight of a solvent, and from 0.05% to 2% by weight of a biocide.

12. A system as in claim 1 wherein the fixer composition further comprises a multivalent salt.

13. A system as in claim 12 wherein the multivalent salt is selected from the group consisting of multivalent metal nitrates, EDTA salts, phosphonium halide salts, organic acids, and combinations thereof.

14. A system as in claim 1 wherein the pigment is a self-dispersed pigment.

15. A system as in claim 1 wherein the pigment is a polymer dispersed pigment.

16. A method of printing a durable ink-jet ink image, comprising:
    a) providing an ink-jet ink comprising
        i) a first liquid vehicle,
        ii) from 0.5% to 6% by weight of a pigment colorant,
        iii) from 0.2% to 15% by weight of an anionic or neutral latex-containing colloidal suspension, wherein the latex-containing colloidal suspension comprises polymeric particulates having a particle size range from about 20 nm to 500 nm, and
        iv) from 0.1% to 5% by weight of latex primer; and
    b) providing a fixer composition comprising
        i) a second liquid vehicle, and
        ii) from 0.2% to 15% by weight of a cationic polymer selected from the group consisting of poly(vinyl pyridine) salts, polyalkylaminoethyl acrylates, polyalkylaminoethyl methacrylates, poly(vinyl imidazole), polyethyleneimines, polybiguanides, and polyguanides;
    c) jetting the ink-jet ink onto a substrate; and
    d) jetting the fixer composition onto the substrate, such that the ink-jet ink contacts the fixer composition, thereby providing a durable and smudge-resistant ink-jet ink image.

17. A method as in claim 16 wherein the step of jetting the ink-jet ink and the step of jetting the fixer composition are both thermal jetting steps.

18. A method as in claim 16 wherein the fixer composition is overprinted on the ink-jet ink.

19. A method as in claim 16 wherein the fixer composition is underprinted beneath the ink-jet ink.

20. A method as in claim 16 wherein the cationic polymer is a polyethyleneimine.

21. A method as in claim 16 wherein the cationic polymer is a polybiguanide.

22. A method as in claim 16 wherein the cationic polymer is a polyguanide.

23. A method as in claim 16 wherein the polymeric particulates have a particle size range from about 100 nm to 300 nm.

24. A method as in claim 16 wherein the polymeric particulates comprise a plurality of randomly polymerized monomers, and wherein the polymeric particulates as a whole have a weight average molecular weight from about 10,000 Mw to 2,000,000 Mw.

25. A method as in claim 24 wherein the polymeric particulates as a whole have a weight average molecular weight from about 40,000 Mw to 100,000 Mw.

26. A method as in claim 7 wherein the plurality of randomly polymerized monomers include methyl methacrylate and hexyl acrylate.

27. A method as in claim 16 wherein the first liquid vehicle comprises water, from 0.05% to 5% by weight of a surfactant, from 5% to 50% by weight of a solvent, and from 0.05% to 2% by weight of a biocide.

28. A method as in claim 16 wherein the second liquid vehicle comprises water, from 0.05% to 5% by weight of a surfactant, from 5% to 50% by weight of a solvent, and from 0.05% to 2% by weight of a biocide.

29. A method as in claim 16 wherein the fixer composition further comprises a multivalent salt.

30. A method as in claim 29 wherein the mulitvalent salt is selected from the group consisting of multivalent metal nitrates, EDTA salts, phosphonium halide salts, organic acids, and combinations thereof.

31. A method as in claim 16 wherein the pigment is a self-dispersed pigment.

32. A method as in claim 16 wherein the pigment is a polymer dispersed pigment.

33. A system for printing durable ink-jet ink images, comprising:
   a) a first ink-jet pen containing an ink-jet ink, said ink-jet ink comprising
      i) a first liquid vehicle, said first liquid vehicle including water, from 0.05% to 5% by weight of a surfactant, from 5% to 50% by weight of a solvent, from 0.05% to 2% by weight of a biocide, and from 0.1% to 5% by weight of a latex primer,
      ii) from 0.5% to 6% by weight of a pigment colorant, said pigment being a polymer dispersed pigment, and p2 iii) from 0.2% to 15% by weight of an anionic or neutral latex-containing colloidal suspension; and
   b) a second ink-jet pen containing a fixer composition, said fixer composition comprising
      i) a second liquid vehicle, and
      ii) from 0.2% to 15% by weight of a cationic polymer selected from the group consisting of polybiguanides and polyguanides,
wherein, upon overprinting or underprinting the fixer composition with respect to the ink-jet ink on a substrate, a durable and smudge resistant image is formed.

34. A system as in claim 33 wherein the latex-containing colloidal suspension comprises polymeric particulates having a particle size range from about 20 nm to 500 nm.

35. A system as in claim 34 wherein the polymeric particulates have a particle size range from about 100 nm to 300 nm.

36. A system as in claim 34 wherein the polymeric particulates comprise a plurality of randomly polymerized monomers, and wherein the polymeric particulates as a whole have a weight average molecular weight from about 10,000 Mw to 2,000,000 Mw.

37. A system as in claim 36 wherein the polymeric particulates as a whole have a weight average molecular weight from about 40,000 Mw to 100,000 Mw.

38. A system as in claim 36 wherein the plurality of randomly polymerized monomers include methyl methacrylate and hexyl acrylate.

39. A system as in claim 33 wherein the second liquid vehicle comprises water, from 0.05% to 5% by weight of a surfactant, from 5% to 50% by weight of a solvent, and from 0.05% to 2% by weight of a biocide.

40. A system as in claim 33 wherein the fixer composition further comprises a multivalent salt.

41. A system as in claim 40 wherein the multivalent salt is selected from the group consisting of multivalent metal nitrates, EDTA salts, phosphonium halide salts, organic acids, and combinations thereof.

42. A system as in claim 33 wherein the pigment is a self-dispersed pigment.

43. A method of printing a durable ink-jet ink image, comprising:
   a) providing an ink-jet ink comprising
      i) a first liquid vehicle, said first liquid vehicle including water, from 0.05% to 5% by weight of a surfactant, from 5% to 50% by weight of a solvent, from 0.05% to 2% by weight of a biocide, and from 0.1% to 5% by weight of a latex primer,
      ii) from 0.5% to 6% by weight of a pigment colorant, and
      iii) from 0.2% to 15% by weight of an anionic or neutral latex-containing colloidal suspension;
   b) providing a fixer composition comprising
      i) a second liquid vehicle, and
      ii) from 0.2% to 15% by weight of a cationic polymer selected from the group consisting of polybiguanides and polyguanides;
   c) jetting the ink-jet ink onto a substrate; and
   d) jetting the fixer composition onto the substrate, such that the ink-jet ink contacts the fixer composition, thereby providing a durable and smudge-resistant ink-jet ink image.

44. A method as in claim 43 wherein the step of jetting the ink-jet ink and the step of jetting the fixer composition are both thermal jetting steps.

45. A method as in claim 43 wherein the fixer composition is overprinted on the ink-jet ink.

46. A method as in claim 43 wherein the fixer composition is underprinted beneath the ink-jet ink.

47. A method as in claim 43 wherein the latex-containing colloidal suspension comprises polymeric particulates having a particle size range from about 20 nm to 500 nm.

48. A method as in claim 47 wherein the polymeric particulates have a particle size range from about 100 nm to 300 nm.

49. A method as in claim 47 wherein the polymeric particulates comprise a plurality of randomly polymerized monomers, and wherein the polymeric particulates as a whole have a weight average molecular weight from about 10,000 Mw to 2,000,000 Mw.

50. A method as in claim 49 wherein the polymeric particulates as a whole have a weight average molecular wieght from about 40,000 Mw to 100,000 Mw.

51. A method as in claim 43 wherein the plurality of randomly polymerized monomers include methyl methacrylate and hexyl acrylate.

52. A method as in claim 43 wherein the second liquid vehicle comprises water, from 0.05% to 5% by weight of a surfactant, from 5% to 50% by weight of a solvent, and from 0.05% to 2% by weight of a biocide.

53. A method as in claim 43 wherein the fixer composition further comprises a multivalent salt.

54. A method as in claim 53 wherein the mulitvalent salt is selected from the group consisting of multivalent metal nitrates, EDTA salts, phosphonium halide salts, organic acids, and combinations thereof.

55. A method as in claim 43 wherein the pigment is a self-dispersed pigment.

56. A method as in claim 43, wherein the pigment is a polymer dispersed pigment.

* * * * *

UNITED STATES PATENT AND TRADEMARK OFFICE
CERTIFICATE OF CORRECTION

PATENT NO. : 7,157,504 B2  
APPLICATION NO. : 10/261441  
DATED : January 2, 2007  
INVENTOR(S) : Ma et al.

Page 1 of 1

It is certified that error appears in the above-identified patent and that said Letters Patent is hereby corrected as shown below:

Col. 15 (line 45), between "and" and "iii)", delete "p2".

Signed and Sealed this

Seventh Day of August, 2007

JON W. DUDAS  
*Director of the United States Patent and Trademark Office*